United States Patent

[11] 3,589,679

| [72] | Inventor | John R. Birk |
| | | Dayton, Ohio |
| [21] | Appl. No. | 880,834 |
| [22] | Filed | Nov. 28, 1969 |
| [45] | Patented | June 29, 1971 |
| [73] | Assignee | The Duriron Company, Inc. |
| | | Dayton, Ohio |

[54] PLUG VALVE
10 Claims, 5 Drawing Figs.

[52] U.S. Cl. .................................................. 251/317
[51] Int. Cl. .................................................. F16k 5/02
[50] Field of Search .................................... 251/317, 312, 171; 137/375

[56] References Cited
UNITED STATES PATENTS

| 1,157,956 | 10/1915 | Osborne | 251/317 X |
| 3,216,698 | 11/1965 | Bouchard et al. | 251/317 |
| 3,383,088 | 5/1968 | Duffey | 251/317 |
| 3,498,317 | 3/1970 | Duffey | 251/317 X |

*Primary Examiner*—M. Cary Nelson
*Assistant Examiner*—Michael O. Sturm
*Attorney*—Marechal, Biebel, French & Bugg ABSTRACT: A rotary plug valve for corrosion-resistant service includes a body bore and a plug and is provided with a deformable bushing of filled fluorocarbon resin surrounding the plug stem and having a lower beveled end engaging in sealing relationship a fluorocarbon sleeve positioned in the valve bore and the top of the plug. Axially extending grooves are formed in the valve bore and portions of the bushing are forced into the grooves to prevent rotation of the bushing after assembly of the valve.

PATENTED JUN29 1971 3,589,679
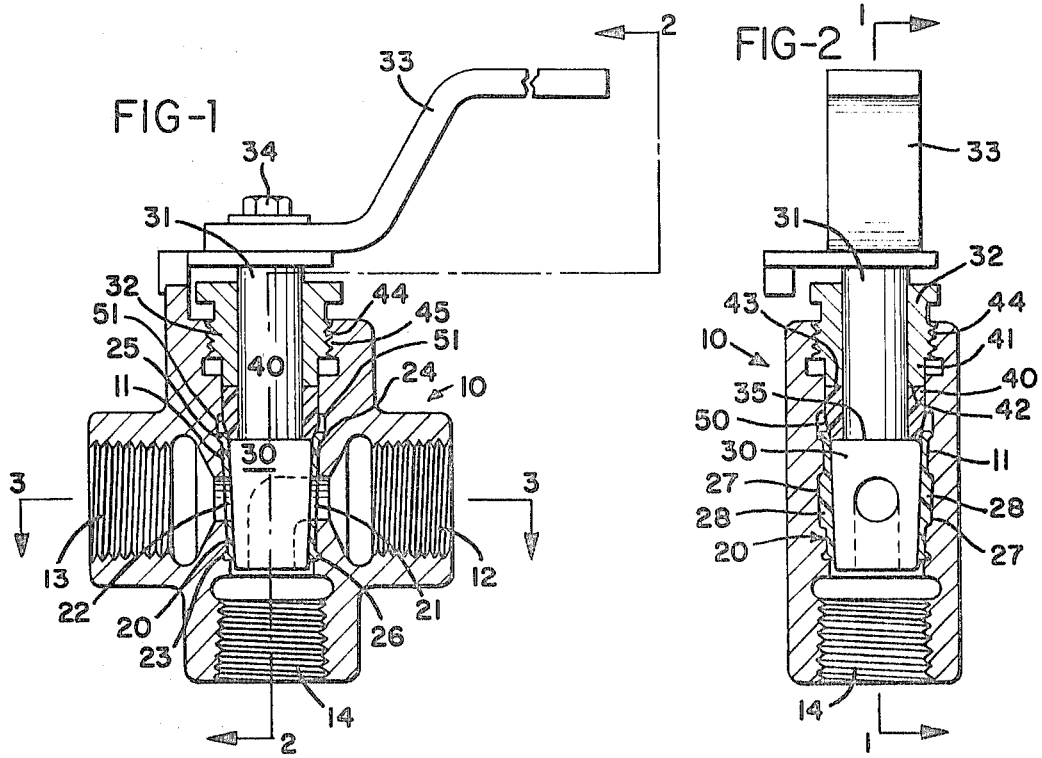
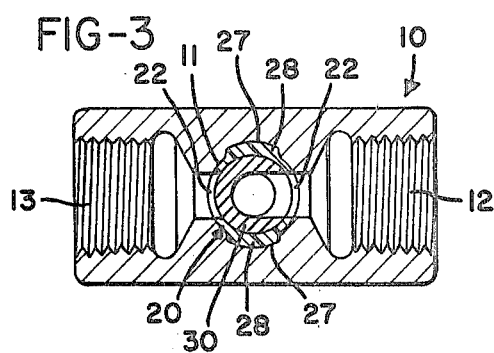
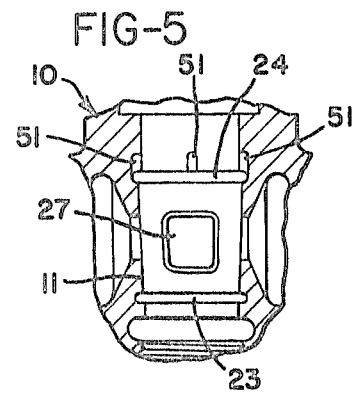
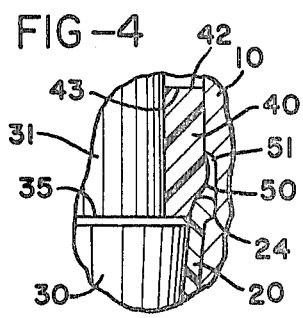
INVENTOR
JOHN R. BIRK
BY Marechal, Biebel, French & Bugg
ATTORNEYS

PLUG VALVE

BACKGROUND OF THE INVENTION

Conventional plug valves generally include a body having two or three ports formed therein and a sleeve of a material such as polytetrafluoroethylene positioned in the bore with openings through the sleeve in alignment with the ports. The bore is generally tapered in cross-sectional configuration and a plug of generally frustoconical configuration is received in the bore. A top cap structure surrounds a stem extending upwardly from the plug and retains the plug seated in the bore in sealing relationship with the sleeve.

In some instances the valve is exposed to widely varying temperature which sometimes results in a loose fit between the plug and sleeve. If the top cap seal then malfunctions because it is exposed to the relatively high pressure of fluid flowing through the valve, fluid leaks out of the valve. To overcome leakage of this type, the top cap structure is tightened, forcing the tapered plug down more tightly into the complementarily tapered bore of the valve. While this expedient, within limits, does alleviate leakage between the plug-sleeve interface, it will be obvious that, aside from the fact that adjustments of this type cannot be made indefinitely, forcing the plug even more tightly down into the bore of the valve increases the torque which is necessary to rotate the plug within the bore to operate the valve.

SUMMARY OF THE INVENTION

In accordance with the present invention, a bushing of a corrosion resistant deformable material, for example, a filled fluorocarbon resin such as PTFE is positioned around the stem of the valve plug and engages the top surface of the plug. The valve sleeve, also of a fluorocarbon resin such as unfilled PTFE, extends upwardly past the top surface of the plug and the lower end of the bushing which is beveled inwardly toward the plug so that it will slide within the upper end of the sleeve and in sealing engagement therewith. Received above the bushing and positioned between the stem of the plug and the body is a threaded collar which includes a boss, the latter engaging the upper end of the bushing and pressing it downwardly against the top of the plug and outwardly into sealing engagement with the upper end of the valve sleeve. The threaded portion of the collar is received in threads provided in the body above the plug. Thus, the bushing functions both to press the plug more tightly into the sleeve, to improve sealing in the conventional fashion, and is also urged outwardly into engagement with the valve sleeve to provide an entirely different seal independent of the extent to which the plug is forced into the valve bore. Axially extending grooves are located circumferentially around the top of the bore and above the normal position of the sleeve so that when the bushing is pressed downwardly and outwardly, portions of the bushing are deformed into these grooves and prevent the bushing from rotating while permitting rotation of the plug. To reduce the turning torque of the plug, the body bore may be coated with a corrosion-resistant elastically compressible sealant as described in U.S. Pat. No. 3,276,739 of Oct. 4, 1966 and assigned to the same assignee.

BRIEF DESCRIPTION OF THE DRAWING

FIG. 1 is a cross-sectional view along the line 1-1 of FIG. 2 through a three-way plug valve in accordance with the present invention;

FIG. 2 is a sectional view taken along the line 2-2 of FIG. 1;

FIG. 3 is a sectional view taken along line 3-3 of FIG. 1;

FIG. 4 is an enlarged fragmentary view of a portion of the structure of FIG. 1; and FIG. 5 is an enlarged fragmentary view of the valve of FIG. 1 with the plug removed and showing the body in section and the bore in elevation.

DESCRIPTION OF THE PREFERRED EMBODIMENT

As shown in the drawing, the plug valve of the present invention comprises a body 10 having a bore 11 disposed substantially centrally thereof. A pair of ports 12 and 13 extend from the exterior of the body 10 into the bore in substantial alignment with each other. A third port 14 may also be provided extending into the bore at right angles to the ports 12 and 13, as viewed in FIG. 1. Although a three-way valve is shown for purposes of illustration, it will be apparent to those skilled in the art that the principles of the present invention are also applicable to two-way valves.

A sleeve member 20 is positioned within the bore and has ports 21 and 22 therethrough communicating with the ports 12 and 13, respectively. A first annular groove 23 is formed in the lower portion of the bore 11 adjacent the entry of the port 14 and a second annular groove 24 is also formed in the bore axially above the ports. Although shown as continuous, the grooves may be interrupted, if desired. The sleeve 20 is provided with beads 25 and 26 adjacent its upper and lower ends which seat in the annular grooves 23 and 24 to prevent movement of the sleeve axially thereof. The bore 11 is also provided with a pair of pockets 27 on opposite sides of the bore intermediate the grooves 23 and 24 and the sleeve includes complementarily shaped areas 28 which are received in the pockets 27 and prevent rotation of the sleeve relative to the bore. The beads and shaped areas 28 are formed during the assembly of the valve.

The valve plug 30 is snugly received in the sleeve in the valve body and includes a stem 31 extending upwardly therefrom through a threaded collar 32 positioned in an opening in the body, the stem extending outwardly of the body where it is engaged by a handle 33 attached to the stem 31 by means of a bolt or the like 34. The upper face 35 of the plug is of a greater radial dimension than the stem to provide an annular free face. With the above construction, it will be apparent that upon rotation of the plug 30 by means of the handle 33 the passage through the plug serves to selectively interconnect either the ports 12 and 14 or the ports 13 and 14.

A bushing 40 is positioned about the stem 31 and rests upon the face 35 formed adjacent the intersection of the stem 31 and the plug body 30. The collar 32 includes a boss portion 41 also surrounding the stem 31, the lower end 42 of the boss engaging the upper end 43 of the bushing 40. The collar 32 is threaded, as at 44, and the body opening is similarly provided with threads 45 engaging the threads 44.

The bushing 40, which is formed of a deformable material, such as polytetrafluoroethylene filled with finely divided glass, has its lower end beveled inwardly toward the plug, as at 50, so that it is readily received within the upper end of the sleeve 20 which is normally dimensioned so that the upper surface 35 of the plug is received below the top of the sleeve. A series of relatively short axial grooves 51 are provided circumferentially of the bore 11 extending axially upwardly from the upper circumferential groove 24.

In assembling the plug valve of the present invention, a sleeve is inserted into place in the bore 11 and cold sized to form the locking beads 25 and 26 and portions 28 seated in the grooves 23 and 24 and the pockets 27, respectively. The plug 30 is then dropped into place within the sleeve and the bushing 40 installed about the stem 31. The collar 32 is then threadedly engaged with the threads 45 and screwed into place, pressing the bushing 40 downwardly upon the plug top surface 35. Tightening of the collar 32 causes the bushing 40 to push the plug down snugly into the sleeve, obtaining a seal around the plug. Additionally, however, the lower beveled end of the bushing is deformed outwardly into sealing engagement with the upper end of the sleeve to provide a second seal entirely independent of the seating of the plug within the bore. The bushing also forces the top of the sleeve radially outwardly in tight sealing engagement with the bore. It will also be noted that as the bushing 40 is pressed downwardly it will be deformed into the grooves 51 and thus, locked into place against rotation within the valve body. This in turn serves to inhibit rotation of the collar 32 and insures that the plug 30 and bushing 40 are retained in their proper positions with respect to the body of the valve.

From the above it will be apparent that a valve constructed in accordance with the present invention, provides means for not only obtaining a seal around the valve plug in the conventional manner but provides an additional seal which functions in an entirely different manner and in a relatively simple valve structure. It should also be noted that not only is a valve according to the present invention ideally suited for use as an instrument valve in small lines ranging from one-fourth inch to 1 inch in diameter but it is also adapted for use in pipelines of a variety of sizes.

Valves in accordance with the present invention were run through a series of heat cycling and pressure tests. The valves were heated to test temperature for several hours, cooled to room temperature, and retested. Results were as follows:

Test 1: A ½-inch-size valve was tested for pressure, and held 600 p.s.i. with a turning torque of 18 inch-pounds. The valve was heat cycled at 150° F. for 2 hours, after which it held 600 p.s.i. pressure, cycled again at 200° F. and again held 600 p.s.i., cycled again at 275° F. and held 280 p.s.i., the leakage being through the valve rather than through the top seal. A one-fourth turn adjustment of the collar 32 was made and the valve held 600 p.s.i.

Test 2: A ½-inch valve in which sealant was used between the bore and the sleeve initially held 600 p.s.i. with a turning torque of 10 inch-pounds. The valve was heat cycled at 150° F. and held 600 p.s.i. with no adjustment, cycled at 200° F. and still held 600 p.s.i. with no adjustment, cycled at 250° F. and held 280 p.s.i., the leakage being "in-line" as noted in test 1. A one-eighth turn of the collar 32 was made to make the valve hold 600 p.s.i. It was then cycled as follows:

| Temperature, °F. | Pressure, p.s.i. | Adjustment | Pressure after adjustment, p.s.i. |
| --- | --- | --- | --- |
| 300 | 300 | ¼ | 600 |
| 350 | 200 | ⅜ | 600 |

The leakage was again "in-line" and not through the top cap.

Test 3: A ¾-inch valve in which sealant was used between the bore and the sleeve initially held 600 p.s.i. with a turning torque of 35 inch-pounds. The valve was heat cycled at 275° F., 300° F., 350° F. and 400° F. in 2-hour intervals. The valve held 600 p.s.i. pressure after each cycle with no adjustment.

Test 4: The same valve of test 3 was rebuilt in order to substantiate the good results of test 3. Cycling was in the range of 150° F. to 400° p.s.i. and the valve held 600 p.s.i. after each cycle. The torque was reduced to 10 inch-pounds.

By using a filled PTFE for the bushing, the effect of temperature cycling is minimized and whereas one would expect substantial movement of the PTFE material, use of a filled PTFE bushing, the lower end which forces the sleeve radially outwardly, substantially eliminates this problem. Moreover, the use of sealant has reduced the turning torque considerably, and its use is suggested in those instances in which low torque is required.

While the form of apparatus herein described constitutes a preferred embodiment of the invention, it is to be understood that the invention is not limited to this precise form of apparatus, and that changes may be made therein without departing from the scope of the invention which is defined in the appended claims.

What I claim is:

1. In a valve comprising a body having a bore, ports communicating with said bore, a rotatable plug received in said bore and being of sufficiently small diameter to establish a clearance between said plug and said bore, said plug including a stem extending out of said bore, a sleeve positioned in said clearance and having openings therethrough communicating with said body ports, passages in said plug cooperating with said body ports for selectively interconnecting said body ports, said body including means forming an opening through which said plug stem extends, the improvement comprising:
   a. a bushing surrounding said stem with one end of said bushing contacting the upper end of said plug in sealing engagement,
   b. a portion of said sleeve extending beyond the said upper end of said plug and including an inner peripheral surface in opposed relation with the one end of said bushing,
   c. the outer surface of said bushing adjacent said one end thereof engaging said portion of said sleeve along said opposed inner peripheral surface thereof and urging said portions of the sleeve radially outwardly to establish a seal therebetween, and
   d. means engaging said bushing at the end thereof opposite said one end for pressing said one end against said upper end of said plug.
2. The apparatus of claim 1 further comprising:
   a. means in said bore defining grooves therein angularly disposed with respect to the direction of rotation of said plug, and
   b. a portion of said bushing being received within said groove means to prevent rotation thereof as said plug is rotated.
3. The apparatus of claim 1 wherein:
   a. said outer surface of said bushing engaging said portion of said sleeve is tapered inwardly toward said plug whereby said bushing enters into said portion of said sleeve to urge said sleeve radially outwardly in sealing engagement with said bore.
4. The apparatus of claim 1 wherein:
   a. said bushing is formed of a readily deformable material.
5. The apparatus of claim 4 wherein:
   a. said bushing is formed of polytetrafluoroethylene.
6. The apparatus of claim 1 wherein said bore includes axially spaced circumferential grooves, the portion of said sleeve opposite said grooves being received therein to prevent axial movement of said sleeve relative to said bore.
7. The apparatus as set forth in claim 2 wherein
   a. said bore includes at least one groove near the open end thereof, the portion of said sleeve opposite said groove being received therein to prevent axial movement of said sleeve relative to said bore, and
   b. said angularly disposed grooves being located axially above said one groove.
8. The apparatus as set forth in claim 1 wherein
   a. said valve has an inlet and an outlet port.
9. The apparatus as set forth in claim 1 wherein
   a. said valve is a three-way valve.
10. A valve comprising:
   a. a body having a tapered bore disposed substantially centrally thereof,
   b. at least two ports communicating with said bore,
   c. a sleeve member positioned in said bore and having openings therein communicating with the ports in said body,
   d. a pair of annular grooves formed in said bore,
   e. said sleeve including beads in engagement with said grooves,
   f. pockets in said bore on opposite sides thereof intermediate said annular grooves,
   g. said sleeve including portions thereof received in said pockets,
   h. a rotatable tapered plug received in said sleeve and urging it radially outwardly into sealing engagement with said bore,
   i. a passage formed in said plug for interconnecting said ports,
   j. said plug including a stem of a diameter less than the plug to provide an upper exposed plug surface,
   k. said body including an open end in alignment with said bore through which said stem extends, l. a deformable bushing positioned in said open end and surrounding said stem with the lower end of said bushing engaging the upper surface of said plug and the outer surface of said bushing adjacent said lower end thereof engaging an inner portion of said sleeve in sealing relationship therewith,
m. a hollow threaded collar received in said open end of said body over said stem,
n. said collar including a boss engaging the end of said bushing opposite said lower end thereof,
o. a plurality of axially extending grooves spaced circumferentially in said bore and communicating with one of said annular grooves, and
p. portions of said bushing being deformed into said axially extending grooves.